Patented Oct. 18, 1949

2,485,203

UNITED STATES PATENT OFFICE 2,485,203

UREA-FORMALDEHYDE COMPOSITIONS

Hamline M. Kvalnes and Franklin S. Chance, Wilmington, Del., assignors to E. I. du Pont de Nemours & Company, Wilmington, Del., a corporation of Delaware No Drawing. Application September 19, 1947, Serial No. 775,148

5 Claims. (Cl. 260—69)

This invention relates to novel urea-formaldehyde compositions, and more particularly to monomeric urea-formaldehyde products having the uron ring structure. This application is a continuation-in-part of our copending application S. N. 588,720, filed April 16, 1945, now U. S. Patent 2,452,200.

Until very recently, attempts to reduce the adverse effects of moisture upon wood, especially shrinkage and swelling, by treatment with urea-formaldehyde reaction products have not led to successful results (Ind. Eng. Chem., 28, 1936, 1165). However, important progress has been made within the past few years, with the result that attractive, hard-surfaced wood products having dimensional stabilities as high as 40% to 50% recently have been prepared through the application of a wood-impregnating agent containing sesquimethylol urea or dimethylol urea (Kvalnes, S. N. 478,666, filed March 10, 1943, now U. S. Patent 2,398,649; Br. 584,380; Cadot, S. N. 478,667, filed March 10, 1943 now abandoned; Wood and Paper-Base Plastics, U. S. D. A., Forest Products Laboratory, Nov., 1943; Chem. and Met. Eng., May 1944, 132; Nature, 153, May 6, 1944, 552; Kvalnes, S. N. 555,042, filed Sept. 20, 1944 now abandoned). The present invention is concerned with further improvements in the manufacture of urea-formaldehyde compositions, especially compositions which are useful in processes for impregnating porous materials, such as wood, etc.

An object of the present invention is to provide an improved composition suitable for use in the hardening and dimensional stabilization of wood. Another object is to provide a wood-impregnating agent having prolonged storage life even in warm climates. A further object is to provide stable liquid urea-formaldehyde compositions. Still another object is to provide an improved method for loading the voids of porous material with resins derived from urea and formaldehyde. Other objects will appear hereinafter.

These and other objects are accomplished in accordance with the invention by providing compositions containing as an essential ingredient a novel substance which gives rise to methyloluron ethers upon etherification with alcohols. The said ingredient is a non-resinous urea-formaldehyde reaction product having the uron ring structure, and is obtained by heating urea with from 4 to 5 mols or more of formaldehyde per mol of urea in alkaline aqueous solution followed by removal of water from the reaction mixture at 100° to 200° F. under diminished pressure. During the water-removal step the mixtures become acidic. The resulting composition contains from 2.5 to 4.0 mols of formaldehyde per mol of urea. It is converted to N,N'-dimethyluron dimethyl ether upon etherification with methanol, and possesses other chemical properties indicating that it contains dimethyluron, having the structure,

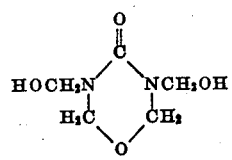

This product containing from 2.5 to 4.0 mols or more of formaldehyde per mol of urea, may be employed in conjunction with urea or a like material containing formaldehyde-reactive hydrogen, (hereinafter called a "hardener"), such as thiourea, melamine, substituted melamines, phenols or mixtures thereof. In preferred embodiments, the amount of hardener admixed with the uron derivative, or other such non-resinous urea-formaldehyde reaction product having from 2.5 to 4.0 mols of combined formaldehyde to combined urea, is sufficient to give a mixture equivalent in total combined formaldehyde:urea ratio of from 1:1 to 4:1 preferably 1:1 to 1.3:1. It is frequently convenient to store the said reaction product for long periods, and to add the hardener thereto shortly before use, i. e., within a day or two before actual impregnation. Since melamine and phenol each have 3 active centers in the molecule, urea having only 2, it follows that 0.66 mol of melamine or phenol are stoichiometrically equivalent to 1.0 mol of urea.

The wood-impregnating compositions prepared in accordance with this invention are markedly superior to the methylol ureas (which are themselves highly effective, as described in U. S. 2,398,649, Br. 584,380, and the copending application S. N. 555,042), especially because the reagents herein disclosed, when admixed with urea or thiourea as stated above, are very much more soluble in water than the methylol ureas, and accordingly can be used for the impregnation of wood with considerably larger quantities of the impregnating agent, since wood saturated with a concentrated solution of the resin-forming ingredient contains more resin-forming material than wood impregnated with a dilute solution. It is believed that the improvement in dimensional stability which is achieved through the use of the impregnating agents described herein is due in part to the fact that they permit impregnation with a larger quantity of the resin-forming ingredient. Thus, the invention involves the concept that an impregnating composition having the desired urea : formaldehyde ratio, but having a much greater solubility than prior compositions of the same urea : formaldehyde ratio, is obtained by admixing the methyloluron composition, as initially obtained, with urea or an equivalent formaldehyde-reactive substance. This increased solubility permits greater loading of the wood voids, for as the concentration of resin-forming ingredients approaches 100%, the percentage of the volume of pores or voids which can be filled in with resin also approaches 100%, with the result that a product having markedly increased dimensional stability is achieved. Moreover, as a result of the fact that the reagent is stable, and soluble in water in all proportions, the resin-forming ingredients after impregnation can slowly, but thoroughly, diffuse through the wood and wet the fibers throughout the entire mass thereof, so that on storage a product containing the impregnating agent throughout the entire bulk of the wood may be obtained, if desired.

As a result of the improvements embodied in the present invention, wood having a remarkably high dimensional stability can be obtained. Other advantages in using the herein-described impregnating agent are that it permits the impregnation of wood which cannot otherwise be easily treated because of the difficulty of diffusing methylol-urea solutions therein; also, by reason of the improved dimensional stability, checking and cracking during rapid kiln-drying are greatly reduced or entirely eliminated. Moreover, when high concentrations of the resin-forming ingredients are used, there is proportionately less water to remove during kiln-drying.

The methylolurons themselves have not been isolated heretofore. In accordance with this invention, a product, herein referred to as "techical dimethyloluron" can be obtained by heating about 4 to 5 mols of formaldehyde in aqueous solution per mol of urea in the presence of an alkaline catalyst, at elevated temperature, and thereafter removing at least a part of the unreacted formaldehyde, and most of the water, under diminished pressure at the elevated temperature. The mixture becomes acidic during this distillation. The residue obtained in this manner generally contains about 3.8 to 4.0 mols of formaldehyde per mol of urea, and is the material referred to herein as "technical dimethyloluron." If a solution of "technical dimethyloluron" is desired, it is preferable not to remove all of the water during the distillation at diminished pressure.

"Technical dimethyloluron" has a unique combination of properties which make it a very valuable reagent for use in the impregnation of wood. It is stable for many months at a pH of about 7 at all temperatures at which it might be stored in commercial practice. It is completely soluble in water in all proportions. The aqueous solutions dissolve surprisingly large amounts of hardeners like thiourea and melamine which normally have a relatively low solubility in water. "Technical dimethyloluron" is a liquid, which can be readily dispensed and handled in commercial operations. Because of these excellent properties it is generally preferred to ship "technical dimethyloluron" separately to the place where it is to be used, and to postpone adding the hardener until shortly before actual application.

The invention is, of course, not limited by any theory as to the chemical constitution of this material, and, while the experimental evidence is indicative of the formula

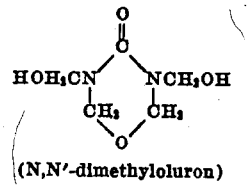
(N,N'-dimethyloluron)

conformity with this structure is considered to be collateral to the invention herein disclosed. It is true, however, that "technical dimethyloluron" has a total urea and formaldehyde content corresponding closely to dimethyloluron, and also that "technical dimethyloluron" reacts with methanol in the presence of acid to form N,N'-dimethyloluron dimethyl ether which is identifiable by boiling point determination. Moreover, as illustrated in the examples, it contains chemically combined formaldehyde which is in a less reactive form than the formaldehyde which is present as N-methylol groups.

"Technical dimethyloluron" differs very markedly from the stabilized polymethylol ureas disclosed in copending application S. N. 732,927, filed March 6, 1947 now U. S. Patent No. 2,467,212. This can be demonstrated by the use of aqueous sodium sulfite; sodium sulfite reacts with free formaldehyde rapidly at 0° C.; it reacts in a similar way at 80° C. with formaldehyde which is combined in the form of N-methylol groups. "Technical dimethyloluron," however, contains methylol and free formaldehyde and also formaldehyde which is combined in such a form that it does not respond to either of these tests. This latter kind of combined formaldehyde is released, however, by hydrolysis in the presence of an acid catalyst. This, it is believed, confirms the existence of the uron ring in "technical dimethyloluron." The formation of the uron ring evidently occurs during distillation of excess water from the mixture at low pressure under acidic conditions. Once the uron ring has been formed it is not destroyed by making the mixture alkaline, and in fact it is stabilized by the action of alkali. This is a useful observation since, for storage purposes, it is frequently desirable to maintain the uron-containing compositions of this invention in alkaline media which are less corrosive than corresponding acidic solutions.

The concentration of solids in the impregnating solution of the invention may be varied over a wide range. The advantages of the invention are preferably realized at relatively high concentrations, preferably about 30% to 95%. The liquid uron derivatives may be employed in the pure or substantially pure form, if desired.

The invention is illustrated further by means of the following examples.

*Example 1.*—A mixture containing 118.5 lbs. (1.42 lb. mols) of 36% aqueous formaldehyde solution (which was free of methanol) was treated with 19 lbs. (0.32 lb. mols) of urea and 0.35 lb. of sodium hydroxide, and the resulting mixture was heated at a temperature of about 190° to 195° F. for about 1.5 hours (pH, initially 10.2). The resultant product was transferred to a vacuum still and was topped under a pressure of 22 to 24 inches of mercury below atmospheric for 1.75 hours to remove most of the water and part of the unreacted formaldehyde. The distillate weighed 71 lbs., and analyzed 9% formaldehyde. From the amount of formaldehyde recovered it may be calculated that the residue ("technical dimethyloluron") contained 3.8 mols of formaldehyde per mol of urea. The water content of this material was about 15 per cent. It had a density of about 1.27, and a pH of 6.7.

*Example 2.*—The "technical dimethyloluron," prepared in accordance with Example 1, was mixed with water and urea to obtain a solution having a concentration of 30% and a formaldehyde: urea mol ratio of 1.3. Gum sapwood veneers were saturated with this solution by means of a vacuum pressure cycle at a pH of about 6 to 7, and were subsequently dried for 4 hours, final temperature being about 140° F. The resulting product had a dimensional stability of 40%. This experiment was repeated using thiourea in place of urea at a concentration of 50%. The dimensional stability of the product was 65%. Similar results were obtained with melamine, and with phenol in place of the added urea component.

*Example 3.*—Example 1 is repeated except that the amount of sodium hydroxide employed is sufficient to keep the mixture alkaline throughout the entire preparation. The resulting distillation residue is analyzed for total formaldehyde by heating a sample with concentrated phosphoric acid to remove aqueous HCHO as a distillate, followed by titration of the HCHO in the distillate. The total HCHO, and the amount of HCHO as measured on a sample of the residue by the neutral sulfite (80° C.) procedure, are equal, i. e. about 54.4%. Similar comparative analyses of the distillation residue obtained in Example 1 show a discrepancy of several per cent between the total HCHO as measured by the phosphoric acid distillation method (also 54.4%) and the amount of HCHO as determined by the neutral sulfite (80° C.) procedure. This is interpreted as showing that the "technical dimethyloluron" of Example 1 actually contains the uron ring, which is not produced in any measurable quantity when the reaction mixture is kept alkaline throughout the entire procedure.

*Example 4.*—"Technical dimethyloluron," prepared as disclosed in Example 1, was mixed with water and thiourea to obtain a solution having a concentration of 50%, and a formaldehyde : (urea+thiourea) ratio of 1.3:1. A portion of the solution was used for vacuum-pressure impregnation of a specimen of maple sapwood two inches thick. The impregnated wood developed no checks during subsequent rapid kiln-drying.

In the foregoing examples the term dimensional stability is used in its usual sense; i. e., dimensional stability is 100 times the ratio of the per cent dimension change of untreated wood minus the per cent dimension change of the treated wood divided by the per cent dimension change of the untreated wood. It may be measured between any levels of humidity or moisture content, but unless otherwise stated, it is measured between the oven-dry and water-wet states.

The examples given above are illustrative only, and represent the general method of the invention without defining its limits. Each of the operations (i. e., (1) preparing the agent, (2) impregnation, (3) drying, and (4) curing) can, of course, be carried out under conditions somewhat different from those disclosed in the examples. In the preparation of the "technical dimethyloluron," any convenient concentration of formaldehyde or paraformaldehyde may be employed. Solutions having a concentration of 37% or 60% give excellent results. Formalin may be employed, but the methanol content of ordinary formalin gives rise to etherification of the methylol groups, which is not always desirable, since it retards setting of the resin. The initial pH may be controlled by any suitable method, such as by the use of buffers; pH should preferably be about 7 to 10.5 initially. At the end of the reaction, the mixture should be slightly acidic, i. e. about 5 to 6.8. The heating period in the preparation of the "technical dimethyloluron" may be from zero to 1.0 hour, or longer, at a temperature preferably of about 100° to 200° F. The vacuum distillation may require about zero to 2 hours, or longer, and should give rise to a product having a concentration in water preferably of from 70 to 100%. These products evidently contain monomeric uron compounds as essential ingredients, especially when the reaction mixture has a relatively low pH during the vacuum distillation. The "technical dimethyloluron" may be stored for any convenient time before use, if desired.

Impregnation of wood with the composition herein described may be accomplished by known methods, such as by prolonged soaking, diffusion under pressure, or by operation of a vacuum-pressure cycle of the kind described in copending application S. N. 555,042. The impregnation is generally conducted at a temperature of 60° F. to 200° F., preferably about 80° to 100° F. for veneers and sapwood in lumber dimensions, and 180° to 200° F. for heartwoods in lumber dimensions. Low temperatures may also be used since the reagent does not tend to crystallize except when cooled to considerably below ordinary room temperature.

After the wood has been impregnated, it may be dried for a period of weeks by standard air-drying procedures used for lumber, or may be heated in a kiln under conditions similar to those employed normally for kiln-drying untreated green wood, or even at higher temperatures to speed up the drying. Temperatures of 100° to 200° F. may be employed, if desired. The preferred drying time varies from 0.5 hour or less for veneers to about 2 weeks or more for stock which has a thickness of 2 inches or more. Very short drying times are sufficient when a highly concentrated solution of the impregnating agent is employed. An alternative method for drying is to air-dry the impregnated wood for a period of time less than that required for completing the drying, and thereafter to heat the stock in a kiln to lower the moisture content to the desired value.

Curing of the dried impregnated product may be carried out either at ordinary pressures, or at pressures up to or even exceeding the crushing strength of the wood. Temperatures of about 200° to 350° F. may be employed to effect the cure, the preferred temperature being about 240 to 320° F. While curing catalysts need not be added to the mixture they may be present, if desired. Any acid-reacting or acid-generating substance may be used for this purpose. However, the acidic constituents of the wood, which may react with materials present in the impregating solution, generally give rise to a sufficient degree of acidity to catalyze the cure.

While in the foregoing examples specific varieties of wood are treated according to the invention, it will be understood that the process may be employed with other varieties of wood, as exemplified by the sapwoods of poplar, birch, pine, and the heartwoods of Douglas fir, Sitka spruce, western hemlock, etc. The invention also contemplates similar impregnation of sawdust, wood flour, grasses, jute, hemp, rattan, reeds, palmetto, Masonite, bagasse, and other forms of woody materials. If desired, the wooden objects may be in the form of veneers, preformed plywood or variously shaped objects such as spools, bobbins, boat ribs, shingles, telephone poles, railway ties, barrel staves, window sashes, automobile and aircraft body parts, filter frames, battery separators, shuttle blocks, draw-twister tubes, bowling pins and the like. In its broader aspects the invention may be applied in the impregnation of porous objects in general, such as paper, cloth, felt, leather, cardboard and the like. It is also useful for plugging the pores or pinholes in objects made of metals, such as welding seams, and the like.

Since many different embodiments of the invention may be made without departing from the spirit and scope thereof, it will be understood that we do not limit ourselves except as set forth in the following claims.

We claim:

1. A liquid composition comprising a urea-formaldehyde reaction product obtained by heating urea with from 4 to 5 mols of formaldehyde per mol of urea in alkaline aqueous solution followed by removal of water from the reaction mixture at 100° to 200° F. under subatmospheric pressure, the said water-removal step being carried out at a pH of 5 to 6.8, whereby a urea-formaldehyde reaction product comprising dimethyloluron is formed, said urea-formaldehyde reaction product having a mol ratio of free and combined formaldehyde to free and combined urea within the range of 2.5:1 to 4.0:1, admixed with a compound of the formula

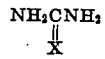

X being a member of the class consisting of oxygen and sulfur, in such proportions that the mol ratio of free and combined formaldehyde to free and combined

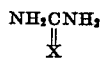

in the resulting mixture is from 1:1 to 1.3:1.

2. The composition of claim 1 in which the said compound of the formula

is thiourea.

3. The composition of claim 1 in which the said compound of the formula

is urea.

4. The composition of claim 1 in which the ratio of free and combined formaldehyde to free and combined

is about 1.3.

5. A liquid composition comprising a urea-formaldehyde reaction product obtained by heating urea with from 4 to 5 mols of formaldehyde per mol of urea in alkaline aqueous solution followed by removal of water from the reaction mixture at 100° to 200° F. under subatmospheric pressure, the said water-removal step being carried out at a pH of 5 to 6.8, whereby a urea-formaldehyde reaction product comprising dimethyloluron is formed, said urea-formaldehyde reaction product having a mol ratio of free and combined formaldehyde to free and combined urea within the range of 2.5:1 to 4.0:1, admixed with a compound of the formula

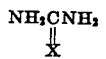

X being a member of the class consisting of oxygen and sulfur, in such proportions that the mol ratio of free and combined formaldehyde to free and combined $$NH_2CNH_2 \\ \| \\ X$$

in the resulting mixture is less than the mol ratio of free and combined formaldehyde to free and combined urea in the said urea-formaldehyde reaction product, and is within the range of 1:1 to 4:1.

HAMLINE M. KVALNES.
FRANKLIN S. CHANCE.

REFERENCES CITED

The following references are of record in the file of this patent:

UNITED STATES PATENTS

| Number | Name | Date |
|---|---|---|
| 2,403,464 | Smith | July 9, 1946 |